June 5, 1928.

W. L. EVANS

RING JOINT

Filed Nov. 29, 1926

1,672,562

Witnesses
C. L. McDonald
E. N. Lovewell

Inventor,
William L. Evans
By
E. G. Siggers
Attorney

Patented June 5, 1928.

1,672,562

UNITED STATES PATENT OFFICE.

WILLIAM LEWIS EVANS, OF WASHINGTON, INDIANA.

RING JOINT.

Application filed November 29, 1926. Serial No. 151,522.

This invention relates to a ring joint, adapted particularly for joining pieces of wood and similar material.

In making the type of joint, which constitutes the subject matter of this application, the pieces to be joined are first cut in their proper form, and are then placed in their proper relative positions while a channel or groove is cut in such a manner as to form a continuous circular channel when the pieces are joined, the center about which the channel is formed being substantially on the line of juncture between the two pieces. A ring is then forced into the channel to complete the joint.

The object of the present invention is to provide a ring of such shape and size that, when it is forced into the channel, stresses will be set up therein, which will cause the ring to exert a most forceful gripping action against the inner wall of the channel and hold the joint tightly together. In the improvement, which results in this increased gripping action, I have provided a ring having a number of opposed substantially straight portions, which must be sprung outwardly or bowed when the ring is forced into position, at the same time spreading the connecting portions of the ring, and drawing them inwardly toward the center.

The specific construction of the invention and the manner in which it is applied will be more fully explained in connection with the accompanying drawing illustrating the same.

The joint, as herein shown and described, is used in connecting two pieces 10, the ends of which are mitered and abut each other along the line 11. In making the joint, the two pieces are placed in the position in which they are to be joined, and a circular channel 12 is cut in the rear face of the pieces, so as to form a boss 13, the center of which is substantially on the line 11. A ring is then forced into the channel 12, which ring may be of the form shown in either of Figures 3, 4, 5 and 6. The means used in applying the ring to the joint is preferably that shown and fully described in Patent No. 1,617,621, but need not be described here.

Figure 1:
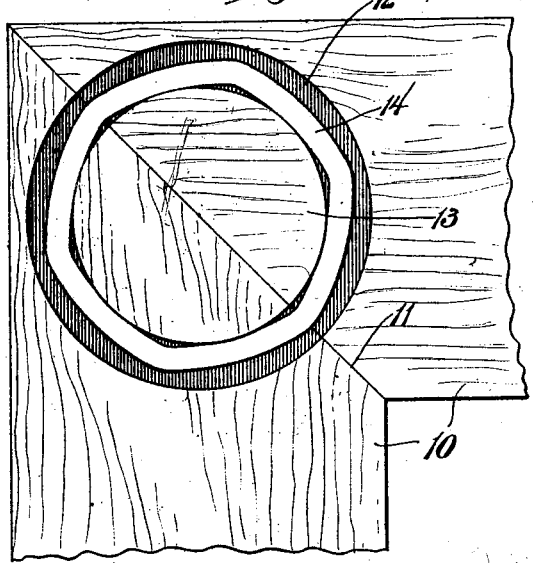
Figure 1 is a rear elevation of a completed joint.
Figure 3:
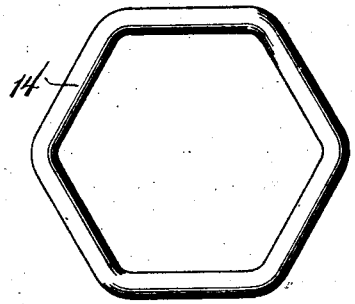
Figure 3 is a plan view of a six-sided ring adapted to be used in making the joint.
Figure 4:
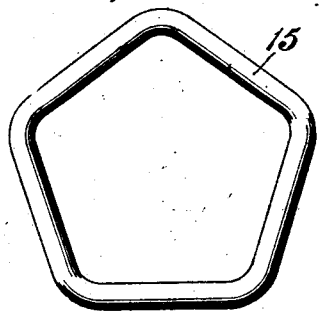
Figures 4 and 5 are rings similar to that shown in Figure 3, but having different numbers of sides.
Figure 2:
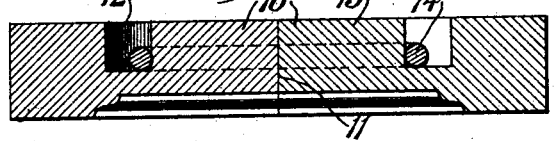
Figure 2 is a central transverse section thereof.

The ring 14, shown in Figures 1, 2 and 3, is substantially hexagonal, but it is preferred to make the corners somewhat rounded, since they do not place undue stress on the metal when manufacturing the ring, and also permit the channel 12 to be made narrower than would otherwise be necessary. The ring is of such size that its apothem is somewhat less than the radius of the boss 13, so that when applying the ring to the joint, the mid points of the sides are forced outwardly, so that in the completed joint, they are bowed or slightly arcuate in shape. This bowing causes the ends of the sides to be drawn nearer together, and as a consequence the corners are drawn inwardly and the angles between the sides are spread. Every part of the ring, therefore, is placed under tension, and the combined stresses all tend to force the sides of the ring inwardly and to grip the wood more tightly. The sides of the ring thus tend to bite into the wood, and the joint is held tightly together with very great pressure. While the six-sided ring is perhaps the preferred form, it may be made with any number of sides. The ring 15, shown in Figure 4, is five-sided, but is otherwise the same as the ring 14, and its action is the same. The ring 16 is four-sided, and the length of a perpendicular from its center to one of its sides is substantially the same as in the other rings.

Figure 6:
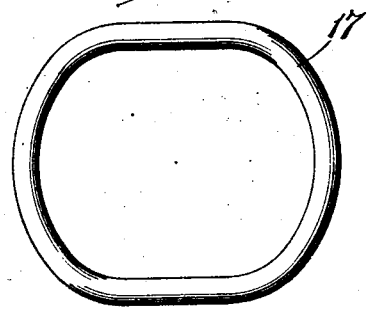
Figure 6 shows another form of ring.
Figure 5:
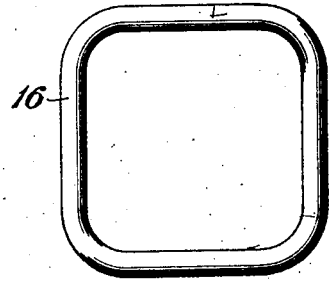

If preferred, the ring may be made in the form shown at 17 in Figure 6. This ring has two opposed straight sides, the ends of which are connected by arcuate portions. In forcing this ring over the boss 13, the mid points of the flat sides are forced outwardly while the arcuate portions are drawn inwardly and spread, thus setting up stresses which are substantially similar to those set up in the polygonal rings 14, 15 and 16.

While I have illustrated a number of different shapes in which the rings may be made, it is to be understood that these are only for the purpose of illustration, and that other forms may be adopted without any material departure from the salient features of the invention as expressed in the claims.

What is claimed is:

1. A wood joint comprising two members with abutting edges with a substantially circular channel formed in the faces of the two members, the center about which the channel is formed being substantially on a line of juncture between the two elements, and a metallic ring in said channel having opposed sides gripping the inner edges of the channel, said opposed sides being bowed outwardly by the pressure of the wood against their mid points, so that the portions of the ring joining said opposed sides are drawn inwardly and spread.

2. A metallic ring for use in making ring joints, said ring having approximately straight side portions arranged like the sides of a polygon with rounded corner portions connecting said side portions, whereby the mid points of said side portions are adapted to be forced outwardly when applying the ring to the joint, thus drawing the corner portions toward the center of the ring and spreading the angle formed thereby.

3. A ring for use in making ring joints, said ring being composed of metal and having at least two opposed approximately straight sides, the mid points of which may be sprung outwardly in applying the ring to the joint, so that said sides assume approximately an arcuate shape to grip the parts of the joint between them, and the portions connecting said sides are spread.

4. A ring for use in permanently holding together ring joints, said ring having a plurality of approximately straight sides connected by curved portions, so that when the portions nearest the center are forced outwardly, the portions farthest from the center will be drawn inwardly.

5. A ring for use in making ring joints, said ring having approximately straight sides connected by curved portions, all of which are outwardly convex, so that when the straight sides are sprung outwardly the curved portions will be drawn inwardly.

6. A ring joint comprising abutting members having an annular channel intersected by the abutting edges; and a spring ring initially in the form of a regular hexagon expanded on the cylindrical boss portion produced by said annular channel; the apothem of said hexagon being less than the radius of said boss so that the sides will be sprung outwardly and exert gripping pressure on the boss.

In testimony, that I claim the foregoing as my own, I have hereto affixed my signature.

WILLIAM LEWIS EVANS.